United States Patent
Milanesi et al.

(10) Patent No.: US 10,111,299 B2
(45) Date of Patent: Oct. 23, 2018

(54) ADAPTIVE OVERVOLTAGE PROTECTION FOR MULTIFUNCTION LED CHAIN

(71) Applicant: Infineon Technologies AG, Neubiberg (DE)

(72) Inventors: Paolo Milanesi, Padua (IT); Roberto Penzo, Chioggia (IT); Maurizio Galvano, Padua (IT); Fabio Fragiacomo, Montegrotto Terme (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/169,424

(22) Filed: May 31, 2016

(65) Prior Publication Data

US 2017/0347412 A1 Nov. 30, 2017

(51) Int. Cl.
*H05B 33/08* (2006.01)

(52) U.S. Cl.
CPC ....... *H05B 33/089* (2013.01); *H05B 33/0824* (2013.01)

(58) Field of Classification Search
None
See application file for complete search history.

(56) References Cited

U.S. PATENT DOCUMENTS

| 7,568,117 | B1 | 7/2009 | Fernald | |
| 8,569,956 | B2* | 10/2013 | Shteynberg | H05B 33/083 315/119 |
| 8,907,592 | B2 | 12/2014 | Hu et al. | |
| 9,401,600 | B2 | 7/2016 | Zhang et al. | |
| 9,648,679 | B2* | 5/2017 | Murakami | F21S 48/1757 |
| 9,750,093 | B2 | 8/2017 | Welten | |
| 2008/0315778 | A1* | 12/2008 | Tatsukawa | H05B 33/0815 315/193 |
| 2010/0060175 | A1* | 3/2010 | Lethellier | H05B 33/0815 315/164 |
| 2011/0227497 | A1 | 9/2011 | Hu et al. | |
| 2011/0248640 | A1 | 10/2011 | Welten | |
| 2012/0170165 | A1 | 7/2012 | Jung et al. | |
| 2015/0256071 | A1 | 9/2015 | Penzo et al. | |

(Continued)

FOREIGN PATENT DOCUMENTS

| CN | 102196618 A | 9/2011 |
| CN | 102239742 A | 11/2011 |
| CN | 103249195 A | 8/2013 |

OTHER PUBLICATIONS

"LITIX™ Power TLD5098EL, Application Boards without IO Filter," Infineon Technologies AG, Feb. 10, 2015, 39 pp.

(Continued)

*Primary Examiner* — Minh D A
*Assistant Examiner* — James H Cho
(74) *Attorney, Agent, or Firm* — Shumaker & Sieffert, P.A.

(57) ABSTRACT

In one example, a method includes determining, by a device of a system, a voltage feedback value that represents a voltage level of a power signal being provided to a plurality of load elements that are selectively active. In this example, the method also includes adjusting, by the device and based on a quantity of load elements of the plurality of load elements that are active, the voltage level of the power signal such that the voltage feedback value remains less than or equal to an overvoltage threshold.

11 Claims, 7 Drawing Sheets

(56) References Cited

U.S. PATENT DOCUMENTS

2016/0064925 A1    3/2016   Zhang et al.
2016/0096467 A1    4/2016   Murakami et al.

OTHER PUBLICATIONS

Office Action, in the German language, from counterpart German Application No. 102017109719.8, dated Apr. 16, 2018, 6 pp.
Office Action, in Chinese language, from counterpart Chinese Patent Application No. 201710398552.6, dated Aug. 28, 2018, 5 pp.

\* cited by examiner

FIG. 7

ADAPTIVE OVERVOLTAGE PROTECTION FOR MULTIFUNCTION LED CHAIN

TECHNICAL FIELD

The invention relates to light emitting diodes (LEDs), and in particular, to circuit configurations and techniques for protecting LEDs from damage.

BACKGROUND

Some applications, such as automotive lighting, may involve LED chains that are made up of a number of LEDs. The number of LED's in a given chain as well as the number of chains may vary depending on the specific application. One or more of the LEDs can be bypassed at times, temporarily reducing the length of any given the LED chain. A driver circuit may control the amount of power provided to LED chain as different numbers of the LEDs in the chain are used.

SUMMARY

In one example, a method includes determining, by a device of a system, a voltage feedback value that represents a voltage level of a power signal being provided to a plurality of load elements that are selectively active; and adjusting, by the device and based on a quantity of load elements of the plurality of load elements that are active, the voltage level of the power signal such that the voltage feedback value remains less than or equal to an overvoltage threshold.

In another example, a system includes a driver device configured to determine a voltage feedback value that represents a voltage level of a power signal being provided to a plurality of load elements that are selectively active; and adjust, based on a quantity of load elements of the plurality of load elements that are active, the voltage level of the power signal such that the voltage feedback value remains less than or equal to an overvoltage threshold.

In another example, a system includes means for determining a voltage feedback value that represents a voltage level of a power signal being provided to a plurality of load elements that are selectively active; and means for adjusting, based on a quantity of load elements of the plurality of load elements that are active, the voltage level of the power signal such that the voltage feedback value remains less than or equal to an overvoltage threshold.

DETAILED DESCRIPTION

In general, this disclosure is directed to circuit configurations and techniques for reducing the amount of energy dissipated by LEDs in an LED chain. As discussed above, an LED chain may include a plurality of LEDs and the number of active LEDs an LED chain may be adjusted. For instance, in an LED chain that has three different activation levels (e.g., F1, F2, and F3), a first group of LEDs of the plurality of LEDs may be activated at a first time (e.g., F1), the first group of LEDs and a second group of LEDs of the plurality of LEDs may be activated at a second time (e.g., F2), and the first and second groups of LEDs and a third group of LEDs of the plurality of LEDs may be activated at a third time (e.g., F3).

As discussed above, a driver circuit may control the amount of power provided to LED chain as different numbers of the LEDs in the chain are used. For instance, a driver circuit may modulate an output voltage signal ($V_{out}$) based on the current LED chain length. To continue the above example where the LED chain has three different activation levels, the driver circuit may set the output voltage level to a first level ($V_{out1}$) when only the first group of LEDs are activated, set the output voltage level to a second level ($V_{out2}$) when only the first and second groups of LEDs are activated, and set the output voltage level to a third level ($V_{out3}$) when the first, second, and third groups of LEDs are activated.

In some examples, the driver circuit may implement a feedback loop that includes measuring the voltage level of the output voltage signal ($V_{fb}$) and adjusting the voltage level of the output voltage signal based on $V_{fb}$. Additionally, in some examples, an output capacitor may be included to stabilize the output voltage signal.

In some examples, the driver circuit may perform one or more operations to provide overvoltage protection for the LEDs. For instance, the driver circuit may be configured to avoid raising the voltage level the output voltage signal above an overvoltage threshold ($V_{OV}$). In other words, the driver circuit may be configured to raise the voltage level the output voltage signal until $V_{fb}$ crosses $V_{OV}$.

If an Open Load (OL) condition happens (e.g., if the load becomes disconnected, such as the result of a loose connection), the measured voltage level of the output voltage signal $V_{out}$ may drift away from the level set by the driver circuit. As such, the driver circuit may attempt to increase the voltage level of the output voltage signal $V_{out}$ up to the overvoltage threshold $V_{OV}$. However, if the OL condition disappears (e.g., if the OL condition is due to intermittent contact), then the energy stored by the output capacitor may be discharged across the currently active LEDs of the LED chain. In some examples, such as where the number of currently active LEDs is relatively low (e.g., F1), the energy stored by the output capacitor may be enough to cause damage to the currently active LEDs, which may not be desirable.

In accordance with one or more techniques of this disclosure, a ratio of the number of currently active LEDs to the overvoltage threshold $V_{OV}$ may be controlled so as to limit the amount of energy discharged across the currently active LEDs of the LED chain. This disclosure presents several examples for how the ratio of the number of currently active LEDs to the overvoltage threshold $V_{OV}$ may be controlled.

As one example, a system may include one or more components configured to scale $V_{fb}$ based on the number of currently active LEDs. For instance, where the LED chain has three different activation levels, the one or more components may scale $V_{fb}$ by a first ratio (e.g., 3/3) where a first group of LEDs of the plurality of LEDs are active, a second ratio (e.g., 2/3) where the first group of LEDs and a second group of LEDs of the plurality of LEDs are active, and a third ratio (e.g., 1/3) where the first and second groups of LEDs and a third group of LEDs of the plurality of LEDs are active. By scaling $V_{fb}$ based on the number of currently active LEDs, the one or more components may cause the driver device to believe the voltage level of the output voltage signal is higher than it actually is, which may reduce how high the driver device may cause the voltage level of the output voltage signal to rise. In this way, the one or more components may reduce the amount of energy stored by the output capacitor, which in turn may reduce the amount of energy dissipated by the currently active LEDs.

As another example, a driver device may be configured to scale the overvoltage threshold $V_{OV}$ based on the number of currently active LEDs. For instance, where the LED chain has three different activation levels, a driver device may use a first overvoltage threshold $V_{OV1}$ where a first group of LEDs of the plurality of LEDs are active, a second overvoltage threshold $V_{OV2}$ where the first group of LEDs and a second group of LEDs of the plurality of LEDs are active, and a third overvoltage threshold $V_{OV3}$ where the first and second groups of LEDs and a third group of LEDs of the plurality of LEDs are active. By scaling the overvoltage threshold $V_{OV}$ based on the number of currently active LEDs, the driver device may reduce the maximum voltage level of the output voltage signal. In this way, the driver device may reduce the amount of energy stored by the output capacitor, which in turn may reduce the amount of energy dissipated by the currently active LEDs.

Figure 1:
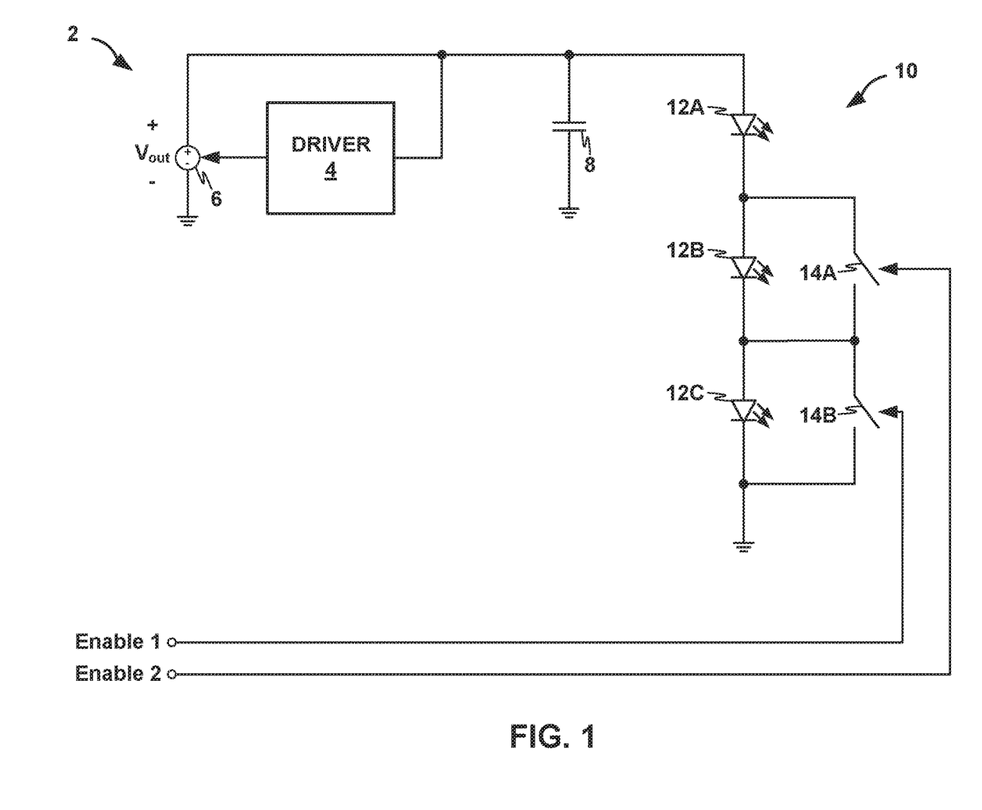
FIG. 1 is a schematic diagram illustrating an example system that includes a driver device configured to protect a load, in accordance with one or more techniques of this disclosure.

FIG. 1 is a schematic diagram illustrating an example system that includes a driver device configured to protect a load, in accordance with one or more techniques of this disclosure. As illustrated in FIG. 1, system 2 includes driver 4, power supply 6, output capacitor 8, and load 10.

In some examples, system 2 may include power supply 6, which may be configured to provide power to one or more other components of system 2. For instance, power supply 6 may provide power to load 10. In some examples, one or more characteristics of the power provided by power supply 6 may be adjustable. For instance, the voltage level of a power signal provided by power supply 6 may be adjustable. As one example, the voltage level of a power signal provided by power supply 6 may be based on a signal received from one or more other components of system 2, such as driver 4.

In some examples, system 2 may include output capacitor 8, which may be configured to filter one or more signals, such as the power signal generated by power supply 6. Output capacitor 8 may store an amount of energy proportional to the voltage across output capacitor 8 and the capacitance of output capacitor 8. For instance, the amount of energy stored by output capacitor 8 may be determined in accordance with Equation (1), below, where Q is the amount of energy stored by output capacitor 8, $V_{oc}$ is the voltage across output capacitor 8, and C is the capacitance of output capacitor 8.

$$Q = V_{oc} * C \qquad (1)$$

In some examples, system 2 may include load 10, which may be configured to receive power from one or more components of system 2, such as power supply 6. Load 10 may include a plurality of load elements. For instance, in the example of FIG. 1, load 10 may include LEDs 12A-12C (collectively, "LEDs 12"). In some examples, load 10 may be a variable load in that a number of active load elements in load 10 may be adjusted. For instance, in the example of FIG. 1, the number of LEDs 12 in load 10 that may be active at a given time may be adjusted via switches 14A and 14B. As one example, where switches 14A and 14B are closed, only a single LED of LEDs 12 may be active (i.e., LED 12A). As another example, where switch 14A is open and switch 14B is closed, two LEDs of LEDs 12 may be active (i.e., LED 12A and LED 12B). As another example, where switch 14A is closed and switch 14B is open, two LEDs of LEDs 12 may be active (i.e., LED 12A and LED 12C). As another example, where switches 14A and 14B are open, all three LEDs of LEDs 12 may be active (i.e., LED 12A, LED 12B, and LED 12C).

In some examples, each of LEDs 12 may represent one or more LEDs configured to operate a specific function. For instance, LED 12A may include one or more LEDs configured to operate as daytime running lights, LED 12B may include one or more LEDs configured to operate as head lights, and LED 12C may include one or more LEDs configured to operate as brake lights.

While described in the example of FIG. 1 as including LEDs 12, the load elements of load 10 may be a wide variety of elements. Other examples of load elements that may be included in load 10 include, but are not necessarily limited to, resistive loads (e.g., incandescent lighting and electrical heaters), capacitive loads (e.g., camera flashes), and inductive loads (e.g., motors and transformers).

In some examples, system 2 may include switches 14A and 14B (collectively, "switches 14"), which may be configured to control activation of load elements of load 10. For instance, switches 14 may be configured to control activation of LEDs 12. As one example, as illustrated in FIG. 1, switch 14A may control activation of LED 12B based on signal "Enable 1" and switch 14A may control activation of LED 12B based on signal "Enable 2". In some examples, signal "Enable 1" and "Enable 2" may be communicated via a communication bus, such as a serial peripheral interface (SPI) bus.

In some examples, system 2 may include driver 4, which may be configured to control the operation of one or more components of system 2. For instance, driver 4 may control the voltage level of a power signal provided by power supply 6. In some examples, driver 4 may control the voltage level of a power signal provided by power supply 6 ($V_{out}$) based on a number of LEDs of LEDs 12 that are currently active. As one example, where all three LEDs of LEDs 12 are active, driver 4 may set the voltage level of Vow to a first level. As another example, where two LEDs of LEDs 12 are active, driver 4 may set the voltage level of $V_{out}$ to a second level that is lower than the first level. As another example, where a single LED of LEDs 12 is active, driver 4 may set the voltage level of $V_{out}$ to a third level that is lower than the second level.

In some examples, the voltage level of the power signal provided by power supply 6 may be adjusted based on the number of LEDs of LEDs 12 that are currently active by components other than driver 4. For instance, a controller that controls which LEDs of LEDs 12 are currently active may adjust the voltage level of the power signal provided by power supply 6 based on the number of LEDs of LEDs 12 that are currently active.

In some examples, driver 4 may implement a feedback loop that includes measuring the voltage level of the power signal provided by power supply 6 and adjusting the voltage level of the power signal provided by power supply 6 based on the measured voltage level.

In some examples, driver 4 may perform one or more operations to provide overvoltage protection for load 10. For instance, driver 4 may be configured to avoid raising the voltage level the power signal provided by power supply 6 above an overvoltage threshold ($V_{OV}$). In other words, driver 4 may be configured to raise the voltage level of the power signal provided by power supply 6 until the measured voltage level of the power signal provided by power supply 6 crosses overvoltage threshold.

If an Open Load (OL) condition happens, the measured voltage level of the output voltage signal $V_{out}$ may drift away from the voltage level set by driver 4. As such, driver 4 may attempt to increase the voltage level of the power signal provided by power supply 6 up to the overvoltage threshold $V_{OV}$. However, if the OL condition disappears (e.g., if the OL condition is due to intermittent contact), then the energy stored by output capacitor 8 may be discharged across load 10. In some examples, such as where the number of currently active load elements of load 10 is relatively low (e.g., only LED 12A is currently active), the energy stored by the output capacitor may be enough to cause damage to the currently active load elements of load 10, which may not be desirable.

In accordance with one or more techniques of this disclosure, a ratio of the number of currently active LEDs of LEDs 12 to the overvoltage threshold $V_{OV}$ may be controlled so as to limit the amount of energy discharged across the currently active LEDs of LEDs 12. This disclosure presents several examples for how the ratio of the number of currently active LEDs of LEDs 12 to the overvoltage threshold $V_{OV}$ may be controlled.

As one example, system 2 may include one or more components configured to scale the voltage feedback level received by driver 4 based on the quantity of LEDs of LEDS 12 that are active. In this way, the one or more components may reduce the amount of energy stored by output capacitor 8, which in turn may reduce the amount of energy dissipated by the currently active LEDs of LEDs 12 (e.g., in the event of an open-load recovery). Further details of an example system that includes one or more components configured to scale the voltage feedback value based on the quantity of LEDs of LEDS 12 that are active are described below with reference to FIG. 3.

As another example, driver 4 may be configured to scale the overvoltage threshold $V_{OV}$ based the quantity of LEDs of LEDS 12 that are active. In this way, driver 4 may reduce the amount of energy stored by output capacitor 8, which in turn may reduce the amount of energy dissipated by the currently active LEDs of LEDs 12 (e.g., in the event of an open-load recovery). Further details of an example system that includes a driver configured to scale the overvoltage threshold $V_{OV}$ based the quantity of LEDs of LEDS 12 that are active are described below with reference to FIG. 5.

Figure 2:
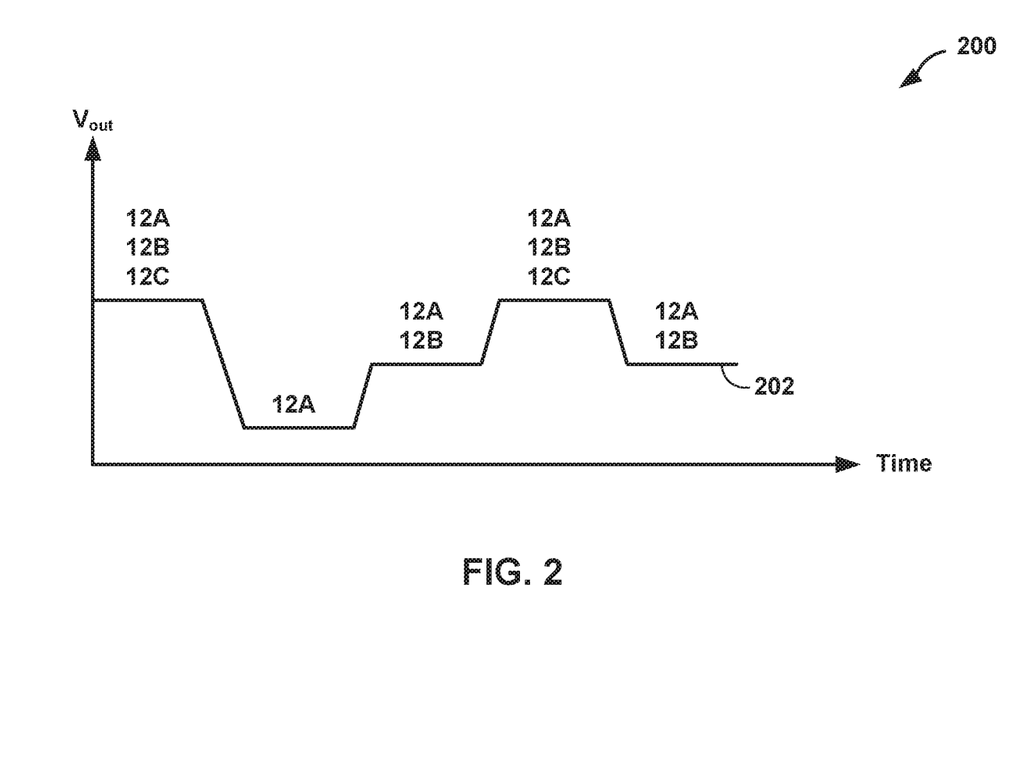
FIG. 2 is a graph illustrating example voltage levels in a system configured to control a ratio of the number of currently active load elements to an overvoltage threshold used to protect the load elements, in accordance with one or more techniques of this disclosure.

FIG. 2 is a graph illustrating example voltage levels in a system configured to control a ratio of the number of currently active load elements to an overvoltage threshold used to protect the load elements, in accordance with one or more techniques of this disclosure. As illustrated in FIG. 2, graph 200 includes a horizontal x-axis indicating a time, a vertical y-axis indicating a voltage level, and plot 202 representing a time/voltage relationship. In some examples, plot 202 may represent the relationship over time between the voltage level of the power signal provided by power supply 6 and the number of currently active LEDs of LEDs 12. As one example, as illustrated in FIG. 2, the voltage level of Vow when all three LEDs of LEDs 12 are active (i.e., LED 12A, LED 12B, and LED 12C are active) may be a first level. As one example, as illustrated in FIG. 2, the voltage level of $V_{out}$ when two LEDs of LEDs 12 are active (i.e., LED 12A and LED 12B are active) may be a second level that is lower than the first level. As one example, as illustrated in FIG. 2, the voltage level of $V_{out}$ when a single LED of LEDs 12 is active (i.e., LED 12A is active) may be a third level that is lower than the second level.

Figure 3:
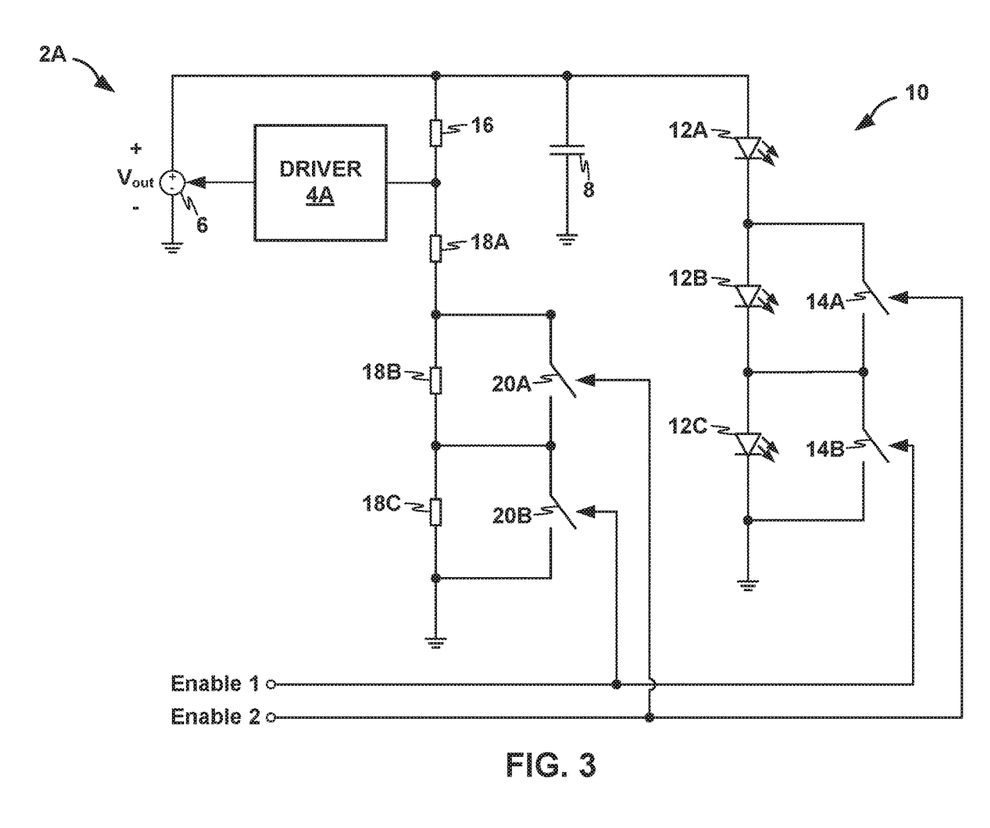
FIG. 3 is a schematic diagram illustrating an example system that includes a driver device configured to protect a load, in accordance with one or more techniques of this disclosure.

FIG. 3 is a schematic diagram illustrating an example system that includes a driver device configured protect a load, in accordance with one or more techniques of this disclosure. As illustrated in FIG. 3, system 2A includes driver 4A, power supply 6, output capacitor 8, load 10, resistor 16, resistors 18A-18C (collectively, "resistors 18"), and switches 20A and 20B (collectively, "switches 20").

As discussed above and illustrated in FIG. 3, system 2A may include one or more components configured to scale the voltage feedback level received by a driver based on the quantity of LEDs of LEDs 12 that are active. In particular, system 2A includes resistor 16, resistors 18, and switches 20 that may scale the voltage feedback level received by a driver based on the quantity of LEDs of LEDs 12 that are active. As illustrated in FIG. 3, resistor 16 and resistors 18 may form a resistor ladder (i.e., a voltage divider) with a transfer function that may be adjusted based on the quantity of LEDs of LEDs 12 that are active. For instance, the state of switches 20 may mirror the state of switches 14 such that each respective switch of switches 20 mirrors the state of a corresponding respective switch of switches 14.

As one example, where switches 14A and 14B may be open such that all three of LEDs 12 are active, switches 20A and 20B may be open such that resistors 16, 18A, 18B, and 18C are included in the resistor ladder. In such an example, the voltage feedback level received by driver 4A may be scaled in accordance with Equation (2), where $V_{fb}$ is the voltage feedback level received by driver 4A, $V_{out}$ is the voltage of the power signal provided by power supply 6, $R_{16}$ is the resistance of resistor 16, $R_{18A}$ is the resistance of resistor 18A, $R_{18B}$ is the resistance of resistor 18B, and $R_{18C}$ is the resistance of resistor 18C.

$$V_{fb} = \frac{R_{18A} + R_{18B} + R_{18C}}{R_{16} + R_{18A} + R_{18B} + R_{18C}} V_{out} \quad (2)$$

As another example, where switch 14A is open and switch 14B is closed such that LED 12A and LED 12B are active, switch 20A may be open and switch 20B may be closed such that resistors 16, 18A, and 18B are included in the resistor ladder. In such an example, the voltage feedback level received by driver 4A may be scaled in accordance with Equation (3).

$$V_{fb} = \frac{R_{18A} + R_{18B}}{R_{16} + R_{18A} + R_{18B}} V_{out} \qquad (3)$$

As another example, where switches 14A and 14B may be closed such that LED 12A is active, switches 20A and 20B may be closed such that resistors 16 and 18A are included in the resistor ladder. In such an example, the voltage feedback level received by driver 4A may be scaled in accordance with Equation (4).

$$V_{fb} = \frac{R_{18A}}{R_{16} + R_{18A}} V_{out} \qquad (4)$$

Figure 4:
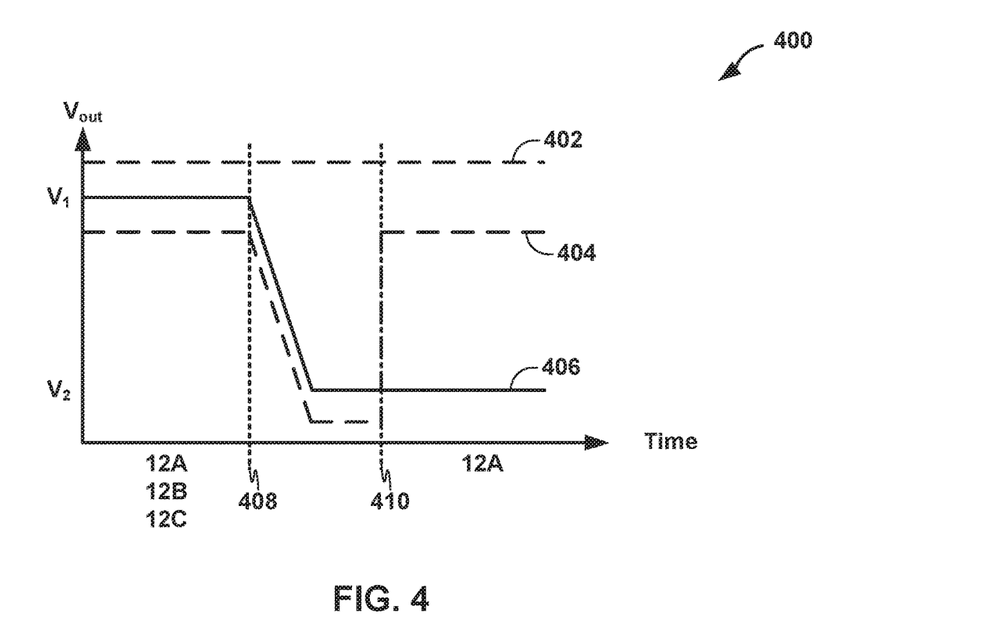
FIG. 4 is a graph illustrating example voltage levels in a system configured to control a ratio of the number of currently active load elements to an overvoltage threshold used to protect the load elements, in accordance with one or more techniques of this disclosure.

FIG. 4 is a graph illustrating example voltage levels in a system configured to control a ratio of the number of currently active load elements to an overvoltage threshold used to protect the load elements, in accordance with one or more techniques of this disclosure. As illustrated in FIG. 4, graph 400 includes a horizontal x-axis indicating a time, a vertical y-axis indicating a voltage level, plot 402 representing a first time/voltage relationship, plot 404 representing a second time/voltage relationship, and plot 406 representing a third time/voltage relationship. In some examples, plot 402 may represent the relationship over time between the overvoltage level $V_{OV}$ used by driver 4A and the number of currently active LEDs of LEDs 12. In some examples, plot 404 may represent the relationship over time between the level of the voltage feedback level received by driver 4A and the number of currently active LEDs of LEDs 12. In some examples, plot 406 may represent the relationship over time between the voltage level of the power signal provided by power supply 6 and the number of currently active LEDs of LEDs 12.

As discussed above, driver 4A may implement a feedback loop that includes measuring the voltage level of the power signal provided by power supply 6 and adjusting the voltage level of the power signal provided by power supply 6 based on the measured voltage level and the number of currently active LEDs of LEDs 12. Additionally, as discussed above, driver 4A may avoid raising the voltage level the power signal provided by power supply 6 above an overvoltage threshold ($V_{OV}$). As discussed above and in accordance with one or more techniques of this disclosure, system 2A may include one or more components configured to scale the voltage feedback level received by driver 4A based on the quantity of LEDs of LEDs 12 that are active.

In operation, all three of LEDs 12 may be active prior to time 408. For instance, prior to time 408, switches 14 may be open and the voltage level of the power signal provided by power supply 6 may be high enough to power all three of LEDs 12 (i.e., $V_1$). Similarly, prior to time 408, switches 20 may be open such that resistors 16, 18A, 18B, and 18C are included in the resistor ladder and the voltage feedback level received by driver 4A is scaled in accordance with Equation (2).

At time 408, system 2A may transition from all three of LEDs 12 being active to only LED 12A being active. For instance, at time 408, the voltage level of the power signal provided by power supply 6 may be reduced to a level sufficient to power only LED 12A (i.e., $V_2$) and switches 14 may close. At time 410, switches 20 may be closed such that resistors 18A and 18B are removed from the resistor ladder and the voltage feedback level received by driver 4A is scaled in accordance with Equation (4). In this way, resistors 16 and 18, and switches 20 may scale the voltage feedback level received by driver 4A based on the quantity of LEDs of LEDs 12 that are active. As can be observed from FIG. 4, scaling the voltage feedback level received by driver 4A as such reduces the difference between the voltage feedback level received by driver 4A and the overvoltage threshold used by driver 4A to protect LEDs 12. By reducing the difference between the voltage feedback level received by driver 4A and the overvoltage threshold used by driver 4A to protect LEDs 12, the techniques of disclosure may reduce the amount of energy stored by output capacitor 8, which in turn may reduce the amount of energy dissipated by the currently active LEDs of LEDs 12 (e.g., in the event of an open-load recovery).

Figure 5:
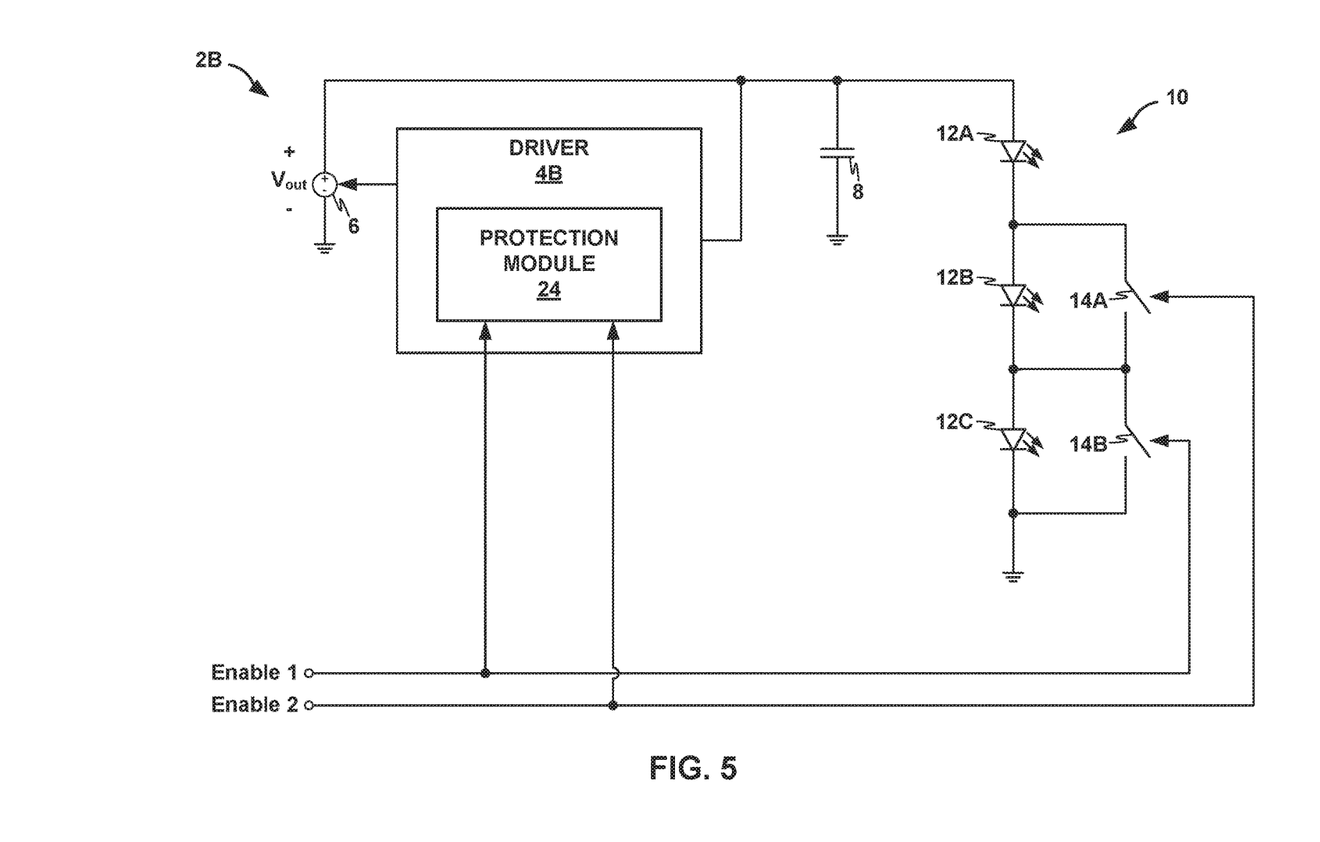
FIG. 5 is a schematic diagram illustrating an example system that includes a driver device configured to protect a load, in accordance with one or more techniques of this disclosure.

FIG. 5 is a schematic diagram illustrating an example system that includes a driver device configured protect a load, in accordance with one or more techniques of this disclosure. As illustrated in FIG. 5, system 2B includes driver 4B, power supply 6, output capacitor 8, and load 10.

In some examples, system 2B may include driver 4B, which may include protection module 24 that may be configured to implement a feedback loop that includes measuring the voltage level of the power signal provided by power supply 6 and adjusting the voltage level of the power signal provided by power supply 6 based on the measured voltage level and the number of currently active LEDs of LEDs 12. Protection module 24 may avoid raising the voltage level the power signal provided by power supply 6 above an overvoltage threshold ($V_{OV}$).

In accordance with one or more techniques of this disclosure, protection module 24 may be configured to determine the overvoltage threshold based on the quantity of LEDs of LEDs 12 that are active. As one example, protection module 24 may use a first overvoltage threshold where all of LEDs 12 are active. As another example, where two LEDs of LEDs 12 are active, protection module 24 may use a second overvoltage threshold that is lower than the first overvoltage threshold. As another example, where a single LED of LEDs 12 is active, protection module 24 may use a third overvoltage threshold that is lower than the second overvoltage threshold.

As illustrated in FIG. 5, in some examples, protection module 24 may determine the quantity of LEDs of LEDs 12 that are active by receiving the same signals used to control switches 14. As discussed above and in some examples, the signals used to control switches 14 may be transmitted using an SPI bus.

Figure 6:
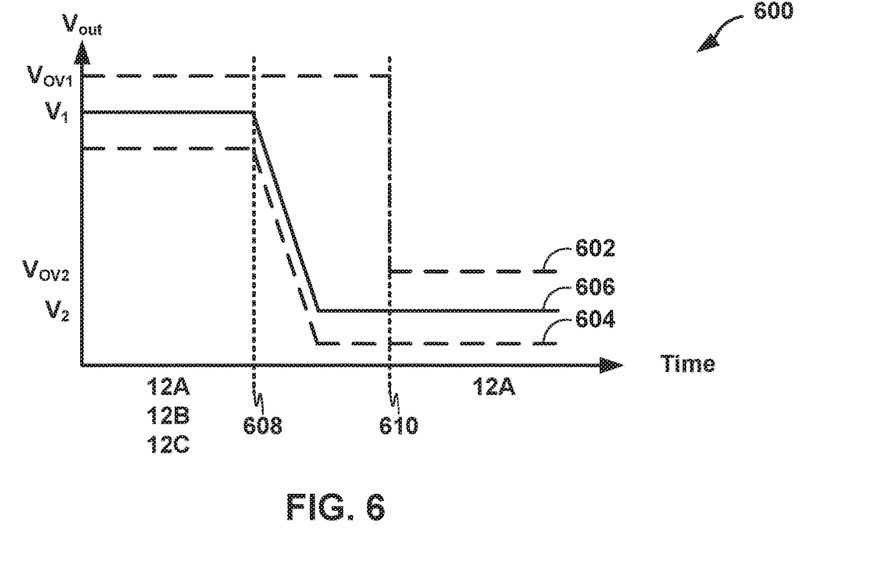
FIG. 6 is a graph illustrating example voltage levels in a system configured to control a ratio of the number of currently active load elements to an overvoltage threshold used to protect the load elements, in accordance with one or more techniques of this disclosure.

FIG. 6 is a graph illustrating example voltage levels in a system configured to control a ratio of the number of currently active load elements to an overvoltage threshold used to protect the load elements, in accordance with one or more techniques of this disclosure. As illustrated in FIG. 6, graph 600 includes a horizontal x-axis indicating a time, a vertical y-axis indicating a voltage level, plot 602 representing a first time/voltage relationship, plot 604 representing a second time/voltage relationship, and plot 606 representing a third time/voltage relationship. In some examples, plot 602 may represent the relationship over time between the overvoltage level $V_{OV}$ used by driver 4A and the number of currently active LEDs of LEDs 12. In some examples, plot 604 may represent the relationship over time between the level of the voltage feedback level received by driver 4A and the number of currently active LEDs of LEDs 12. In some examples, plot 606 may represent the relationship over time between the voltage level of the power signal provided by power supply 6 and the number of currently active LEDs of LEDs 12.

As discussed above, protection module 24 of driver 4B may implement a feedback loop that includes measuring the voltage level of the power signal provided by power supply 6 and adjusting the voltage level of the power signal provided by power supply 6 based on the measured voltage level and the number of currently active LEDs of LEDs 12. Additionally, as discussed above, driver 4A may avoid raising the voltage level the power signal provided by power supply 6 above an overvoltage threshold ($V_{OV}$). As discussed above and in accordance with one or more techniques of this disclosure, protection module 24 may be configured to determine the overvoltage threshold based on the quantity of LEDs of LEDs 12 that are active.

In operation, all three of LEDs 12 may be active prior to time 608. For instance, prior to time 608, switches 14 may be open and the voltage level of the power signal provided by power supply 6 may be high enough to power all three of LEDs 12 (i.e., $V_1$). Similarly, prior to time 608, protection module 24 may use a first overvoltage threshold (i.e., $V_{OV1}$) to protect LEDs 12.

At time 608, system 2B may transition from all three of LEDs 12 being active to only LED 12A being active. For instance, at time 608, the voltage level of the power signal provided by power supply 6 may be reduced to a level sufficient to power only LED 12A (i.e., $V_2$) and switches 14 may close. At and after time 610, protection module 24 may use a second overvoltage threshold (i.e., $V_{OV2}$) to protect LEDs 12. In this way, protection module 24 may determine the overvoltage threshold based on the quantity of LEDs of LEDs 12 that are active. As can be observed from FIG. 6, adjusting the overvoltage threshold used by protection module 24 of driver 4B as such reduces the difference between the voltage feedback level received by driver 4B and the overvoltage threshold used by driver 4B to protect LEDs 12. By reducing the difference between the voltage feedback level received by driver 4B and the overvoltage threshold used by driver 4B to protect LEDs 12, the techniques of disclosure may reduce the amount of energy stored by output capacitor 8, which in turn may reduce the amount of energy dissipated by the currently active LEDs of LEDs 12 (e.g., in the event of an open-load recovery).

Figure 7:
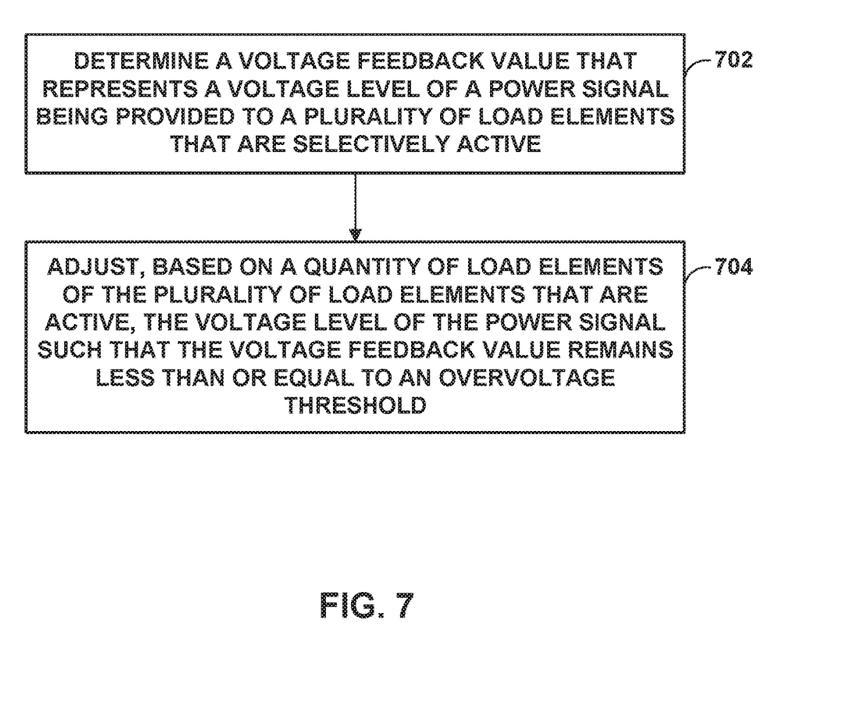
FIG. 7 is a flow diagram illustrating an example technique for protecting a load from overvoltage, in accordance with one or more techniques of this disclosure.

FIG. 7 is a flow diagram illustrating an example technique for protecting a load from overvoltage, in accordance with one or more techniques of this disclosure. For purposes of illustration only, the example operations are described below within the context of driver 4, as shown in FIG. 1, though driver devices other than driver 4 may perform the techniques of FIG. 7.

In accordance with one or more techniques of this disclosure, driver 4 of system 2 may determine a voltage feedback value that represents a voltage level of a power signal being provided to a plurality of load elements that are selectively active (702). For instance, driver 4 may determine a voltage feedback value ($V_{fb}$) that represents the voltage level of the power signal provided to LEDs 12 by power supply 6. In some examples, the voltage feedback value received by driver 4 may be scaled based on the quantity of load elements of the plurality of load elements that are active. For instance, one or more components of system 2 that are external to driver 4 may scale the voltage feedback value based on the quantity of load elements of the plurality of load elements that are active. As discussed above, in some example, the one or more components may include a plurality of resistors (e.g., resistors 18 of FIG. 3) that are selectively included in resistor ladder, and one or more switches (e.g., switches 20 of FIG. 3) configured to adjust a quantity of resistors of the plurality of resistors included in the resistor ladder based on the quantity of load elements of the plurality of load elements that are active.

Driver 4 may adjust, based on a quantity of load elements of the plurality of load elements that are active, the voltage level of the power signal such that the voltage feedback value remains less than or equal to an overvoltage threshold (704). For instance, driver 4 may adjust the voltage level of the power signal provided by power supply 6 such that the voltage feedback value ($V_{fb}$) remains less than or equal to an overvoltage threshold ($V_{OV}$). In some examples, driver 4 may determine the overvoltage threshold based on the quantity of load elements of the plurality of load elements that are active.

In this way, the techniques of this disclosure may reduce the difference between the voltage feedback level received by driver 4 and the overvoltage threshold used by driver 4 to protect the load elements. By reducing the difference between the voltage feedback level received by driver 4 and the overvoltage threshold used by driver 4 to protect the load elements, the techniques of disclosure may reduce the amount of energy stored by an output capacitor (e.g., output capacitor 8), which in turn may reduce the amount of energy dissipated by the currently active load elements (e.g., in the event of an open-load recovery).

The following numbered examples may illustrate one or more aspects of the disclosure:

EXAMPLE 1

A method comprising: determining, by a device of a system, a voltage feedback value that represents a voltage level of a power signal being provided to a plurality of load elements that are selectively active; and adjusting, by the device and based on a quantity of load elements of the plurality of load elements that are active, the voltage level of the power signal such that the voltage feedback value remains less than or equal to an overvoltage threshold.

EXAMPLE 2

The method of example 1, further comprising: determining the overvoltage threshold based on the quantity of load elements of the plurality of load elements that are active.

EXAMPLE 3

The method of any combination of examples 1-2, further comprising: scaling the voltage feedback value based on the quantity of load elements of the plurality of load elements that are active.

EXAMPLE 4

The method of any combination of examples 1-2, wherein scaling the voltage feedback value comprises: scaling, by one or more components of the system that are external to the device, the voltage feedback value based on the quantity of load elements of the plurality of load elements that are active.

EXAMPLE 5

The method of example 4, wherein the one or more components comprise: a plurality of resistors selectively included in resistor ladder; and one or more switches configured to adjust a quantity of resistors of the plurality of resistors included in the resistor ladder based on the quantity of load elements of the plurality of load elements that are active.

EXAMPLE 6

The method of any combination of examples 1-5, wherein the system includes an output capacitor configured to filter the power signal.

EXAMPLE 7

The method of any combination of examples 1-6, wherein the plurality of load elements comprises a plurality of light emitting diodes (LEDs).

EXAMPLE 8

A system comprising a driver device configured to: determine a voltage feedback value that represents a voltage level of a power signal being provided to a plurality of load elements that are selectively active; and adjust, based on a quantity of load elements of the plurality of load elements that are active, the voltage level of the power signal such that the voltage feedback value remains less than or equal to an overvoltage threshold.

EXAMPLE 9

The system of example 8, wherein the driver device is further configured to: determine the overvoltage threshold based on the quantity of load elements of the plurality of load elements that are active.

EXAMPLE 10

The system of example 8, wherein the driver device is further configured to: scale the voltage feedback value based on the quantity of load elements of the plurality of load elements that are active.

EXAMPLE 11

The system of example 10, further comprising one or more components external to the driver device that are configured to: scale the voltage feedback value based on the quantity of load elements of the plurality of load elements that are active.

EXAMPLE 12

The system of example 11, wherein the one or more components comprise: a plurality of resistors selectively included in resistor ladder; and one or more switches configured to adjust a quantity of resistors of the plurality of resistors included in the resistor ladder based on the quantity of load elements of the plurality of load elements that are active.

EXAMPLE 13

The system of any combination of examples 8-12, further comprising: an output capacitor configured to filter the power signal.

EXAMPLE 14

The system of any combination of examples 8-13, wherein the plurality of load elements comprises a plurality of light emitting diodes (LEDs).

EXAMPLE 15

A system comprising a driver device, the driver device comprising: means for determining a voltage feedback value that represents a voltage level of a power signal being provided to a plurality of load elements that are selectively active; and means for adjusting, based on a quantity of load elements of the plurality of load elements that are active, the voltage level of the power signal such that the voltage feedback value remains less than or equal to an overvoltage threshold.

EXAMPLE 16

The system of example 15, wherein the driver device further comprises: means for determining the overvoltage threshold based on the quantity of load elements of the plurality of load elements that are active.

EXAMPLE 17

The system of example 15, further comprising: means for scaling the voltage feedback value based on the quantity of load elements of the plurality of load elements that are active.

EXAMPLE 18

The system of example 17, wherein the means for scaling the voltage feedback value are external to the driver device.

EXAMPLE 19

The system of any combination of examples 15-18, wherein the system includes an output capacitor configured to filter the power signal.

EXAMPLE 20

The system of any combination of examples 15-19, wherein the plurality of load elements comprises a plurality of light emitting diodes (LEDs).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   determining, by a device of a system, a voltage feedback value that represents a voltage level of a power signal being provided to a plurality of load elements that are selectively active;
   scaling, by one or more components of the system that are external to the device, the voltage feedback value based on the quantity of load elements of the plurality of load elements that are active; and
   adjusting, by the device and based on a quantity of load elements of the plurality of load elements that are active, the voltage level of the power signal such that the voltage feedback value remains less than or equal to an overvoltage threshold.

2. The method of claim 1, wherein the one or more components comprise:
   a plurality of resistors selectively included in resistor ladder; and
   one or more switches configured to adjust a quantity of resistors of the plurality of resistors included in the resistor ladder based on the quantity of load elements of the plurality of load elements that are active.

3. The method of claim 1, wherein the system includes an output capacitor configured to filter the power signal.

4. The method of claim 1, wherein the plurality of load elements comprises a plurality of light emitting diodes (LEDs).

5. A system comprising:
   a driver device configured to:
      determine a voltage feedback value that represents a voltage level of a power signal being provided to a plurality of load elements that are selectively active; and
      adjust, based on a quantity of load elements of the plurality of load elements that are active, the voltage level of the power signal such that the voltage feedback value remains less than or equal to an overvoltage threshold; and
   one or more components external to the driver device that are configured to scale the voltage feedback value based on the quantity of load elements of the plurality of load elements that are active.

6. The system of claim 5, wherein the one or more components comprise:
   a plurality of resistors selectively included in resistor ladder; and
   one or more switches configured to adjust a quantity of resistors of the plurality of resistors included in the resistor ladder based on the quantity of load elements of the plurality of load elements that are active.

7. The system of claim 5, further comprising:
   an output capacitor configured to filter the power signal.

8. The system of claim 5, wherein the plurality of load elements comprises a plurality of light emitting diodes (LEDs).

9. A system comprising:
   a driver device, the driver device comprising:
      means for determining a voltage feedback value that represents a voltage level of a power signal being provided to a plurality of load elements that are selectively active; and
      means for adjusting, based on a quantity of load elements of the plurality of load elements that are active, the voltage level of the power signal such that the voltage feedback value remains less than or equal to an overvoltage threshold; and
   means for scaling the voltage feedback value based on the quantity of load elements of the plurality of load elements that are active, wherein the means for scaling the voltage feedback value are external to the driver device.

10. The system of claim 9, wherein the system includes an output capacitor configured to filter the power signal.

11. The system of claim 9, wherein the plurality of load elements comprises a plurality of light emitting diodes (LEDs).

* * * * *